L. SCOPEL.
AUTOMOBILE DRAFT DEVICE.
APPLICATION FILED APR. 19, 1921.
1,410,412. Patented Mar. 21, 1922.
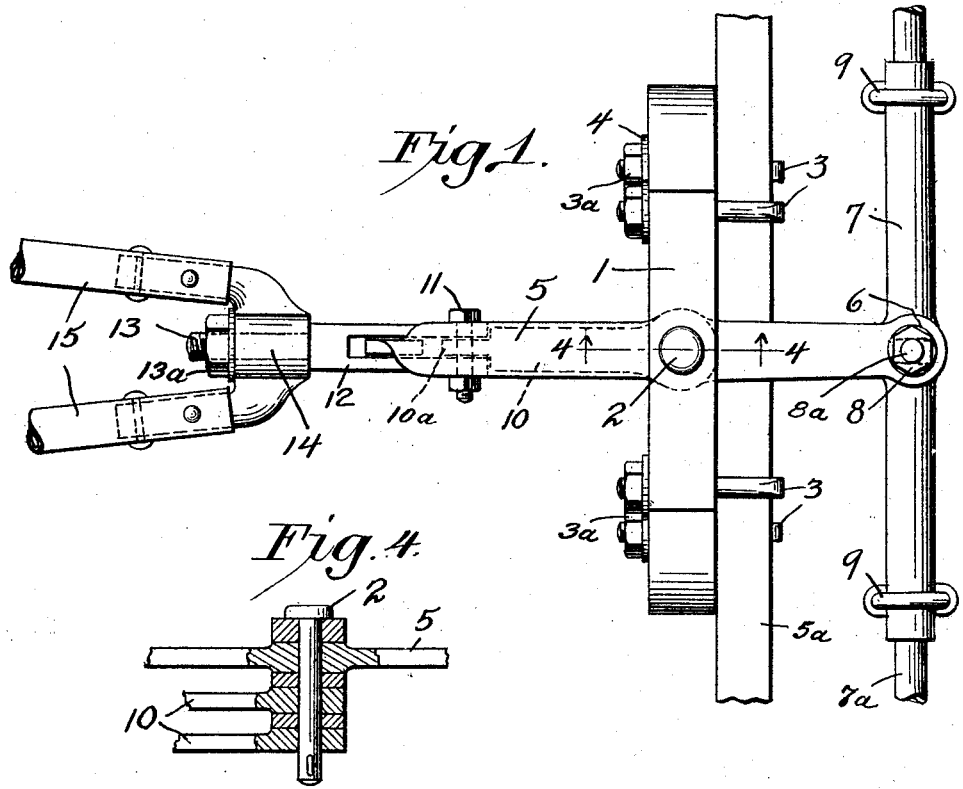
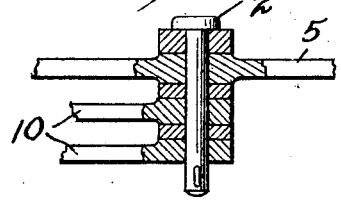
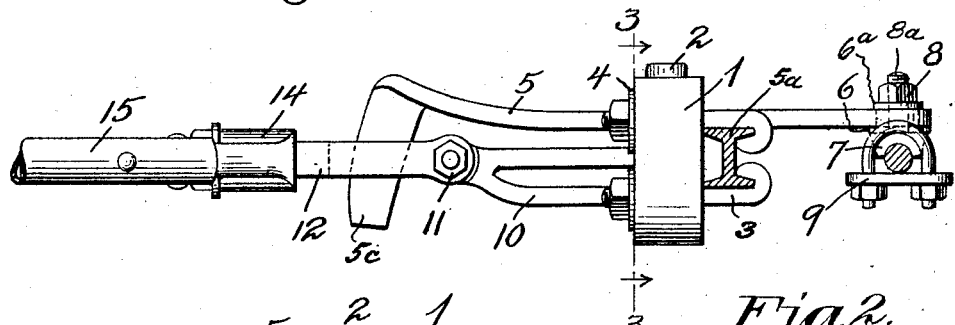
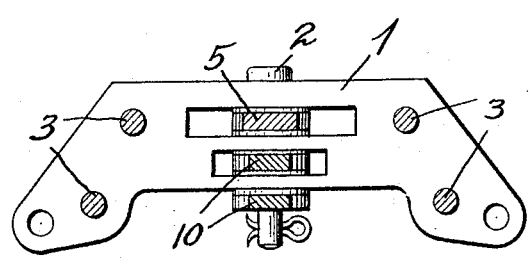
Inventor:
Louis Scopel

UNITED STATES PATENT OFFICE.

LOUIS SCOPEL, OF BENLD, ILLINOIS.

AUTOMOBILE DRAFT DEVICE.

1,410,412.  Specification of Letters Patent.  Patented Mar. 21, 1922.

Application filed April 19, 1921. Serial No. 462,749.

*To all whom it may concern:*

Be it known that I, LOUIS SCOPEL, a citizen of the United States, residing at Benld, in the county of Macoupin and State of Illinois, have invented new and useful Improvements in Automobile Draft Devices, of which the following is a specification.

The object of my present invention is the provision of a simple, easily applied and efficient draft device constructed with a view to enabling the driver of a forward car to control the steering of the rear or drawn car so as to obviate the necessity of a person occupying the drawn car and manipulating the steering means thereof.

To the attainment of the foregoing, the invention consists in the improvement as hereinafter described and definitely claimed.

In the accompanying drawings, forming part of this specification:—

Figure 1 is a plan view illustrative of the manner in which my improvement is arranged relatively to the car to be drawn.

Figure 2 is a side elevation, partly in section, of the same.

Figure 3 is a transverse section taken in the plane indicated by the line 3—3 of Figure 2, looking toward the right.

Figure 4 is a detail longitudinal vertical section on the line 4—4 of Figure 1.

Similar numerals of reference designate corresponding parts in all of the views of the drawings.

At $5^a$ is the front axle of the automobile to be drawn, and at $7^a$ is the connecting rod interposed between the knuckles (not shown) by which the front wheels of the automobile are carried.

Connected by shackles 9 to the said connecting rod $7^a$ is a saddle bar 7 from the center of which rises a threaded post $8^a$. Mounted on the said post $8^a$ and superimposed on the saddle bar 7 is a washer 6, and pivotally mounted on the said post $8^a$ and interposed between the washer 6 and an upper washer $6^a$ Figure 2, is a horizontally swinging link 5, the said link 5 being provided at its forward end with a pendent portion $5^c$, for a purpose hereinafter set forth, and being secured by a nut 8 between the washers 6 and $6^a$. At 1 is a block arranged immediately in front of and in parallelism to the axle $5^a$. The said block 1 is connected to the axle $5^a$ through the medium of hook bolts 3, the shanks of which extend through the block 1 and are equipped with nuts $3^a$, between which and the block 1 are interposed washers 4. A pin 2 serves to pivotally connect the link 5 in and to the block 1, and the said pin 2 also serves to effect pivotal connection of a horizontally swinging bifurcated member 10 which is provided at its forward end with a reduced portion or tongue $10^a$. The said tongue $10^a$ is arranged in a bifurcation at the rear end of a member 12 and is pivotally connected to the said member 12 through the medium of a transverse bolt 11. At its forward end the member 12 is provided with a stem 13 which is secured by a nut $13^a$ in a sleeve 14 at the rear end of a yoke 15, the said stem 14 being adapted to be turned about its axis in the sleeve 14. The said yoke 15 is adapted to be appropriately connected with either the chassis or the rear axle of the forward automobile. Manifestly in virtue of the pendent portion $5^c$ of the link 5 being movable vertically in the bifurcation of the member 12, and the members 10 and 12 being pivotally connected at 11, the coupling is adapted to flex upwardly, and the member 12 is adapted to swing about its axis without detracting from the rigid character of the connections between the coupling members for movement of the said members horizontally in order to swing the link 5 and through the said link manipulate or move the connecting bar $7^a$.

It will be apparent from the foregoing that my novel draft appliance is susceptible of being quickly and easily applied, and is so constructed that it is adapted to serve the purpose stated without subjecting either of the automobiles to undue strain.

I have entered into a detailed description of the construction and relative arrangement of the parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claims.

Having described my invention, what I claim and desire to secure by Letters-Patent, is:—

1. In an automobile draft device, a block equipped for connection to the front axle of an automobile, a horizontally swinging link fulcrumed at an intermediate point of its length in the said block and having a forward vertically disposed tongue, a member pivotally connected to the block in position to swing horizontally and extending forwardly from the block, a yoke adapted for connection to a forward automobile and having a sleeve at its rear end, and a member journaled in and secured to the sleeve of the yoke and having an opening receiving the vertically disposed portion of the link and also having its rear portion connected by a horizontal pivot connection with the forward portion of the first-named member.

2. In an automobile draft device, a block equipped for connection to the front axle of an automobile, a horizontally swinging link fulcrumed at an intermediate point of its length in the said block and having a forward vertically disposed tongue, a member pivotally connected to the block in position to swing horizontally and extending forwardly from the block, a yoke adapted for connection to a forward automobile and having a sleeve at its rear end, and a member journaled in and secured to the sleeve of the yoke and having an opening receiving the vertically disposed portion of the link and also having its rear portion connecting by a horizontal pivot connection with the forward portion of the first-named member; the said link being equipped on its rear arm with a saddle bar to which it is pivotally connected, and the said saddle bar being equipped for attachment to the transverse connecting bar on a rear automobile.

In testimony whereof, I affix my signature.

LOUIS SCOPEL.